(12) United States Patent
Tsengas

(10) Patent No.: US 7,631,617 B1
(45) Date of Patent: Dec. 15, 2009

(54) RETRACTABLE PET TOY

(75) Inventor: Steven Tsengas, Fairport Harbor, OH (US)

(73) Assignee: OurPet's Co., Fairport Harbor, OH (US)

(*) Notice: Subject to any disclaimer, the term of this patent is extended or adjusted under 35 U.S.C. 154(b) by 124 days.

(21) Appl. No.: 11/865,105

(22) Filed: Oct. 1, 2007

(51) Int. Cl.
*A01K 29/00* (2006.01)

(52) U.S. Cl. .................................... 119/707

(58) Field of Classification Search ............. 119/707, 119/708, 709, 710, 711, 702, 706
See application file for complete search history.

(56) References Cited

U.S. PATENT DOCUMENTS

| | | | |
|---|---|---|---|
| 3,213,844 A * | 10/1965 | William ................. | 124/29 |
| 4,803,953 A * | 2/1989 | Graves ................. | 119/707 |
| 5,322,036 A | 6/1994 | Merino | |
| 5,467,740 A | 11/1995 | Redwine | |
| 5,542,376 A | 8/1996 | Udelle et al. | |
| 5,634,436 A * | 6/1997 | Coombs et al. ............. | 119/707 |
| 5,743,215 A | 4/1998 | Zeff | |
| 5,782,207 A | 7/1998 | Goodham | |
| 5,870,971 A | 2/1999 | Krietzman et al. | |
| 5,947,790 A | 9/1999 | Gordon | |
| 6,378,464 B1 | 4/2002 | Ritchey | |
| 6,401,665 B1 | 6/2002 | Gentile | |
| 6,571,742 B1 * | 6/2003 | Tsengas ................. | 119/707 |
| 7,246,574 B2 * | 7/2007 | Renforth ................. | 119/711 |

* cited by examiner

*Primary Examiner*—Yvonne R. Abbott
(74) *Attorney, Agent, or Firm*—John D. Gugliotta, PE, Esq.

(57) ABSTRACT

The present invention generally relates to a pet toy and, more specifically, to a pet toy that is removably secured to a home fixture such that a retraction mechanism delivers an opposing force that reels the toy inward, thus interactively challenging the pet. The instant abstract is neither intended to define the invention disclosed in this specification nor intended to limit the scope of the invention in any way.

11 Claims, 2 Drawing Sheets

RETRACTABLE PET TOY

RELATED APPLICATIONS

The present application is a continuation of U.S. Prov. No. 60/841,270 and claims a priority benefit to its Aug. 31, 2006 priority date. This application incorporates all the subject matter disclosed in ('279) as if it is fully rewritten herein.

BACKGROUND OF THE INVENTION

1. Field of the Invention

The present invention generally relates to a pet toy and, more specifically, to a pet toy that is removably secured to a home fixture such that a retraction mechanism delivers an opposing force that reels the toy inward, thus interactively challenging the pet.

2. Description of the Related Art

Pet toys are categorized as either static toys or dynamic toys. The former comprises no means of motion, but the latter comprises such a means. This means is directed towards a sending of the toy in an uncontrolled direction and towards a duration in which the motion occurs. The motion limitations of static toys cause pets to quickly become bored with them. Dynamic toys, on the other hand, are more attractive to pets because they invoke the pet's instinct to chase and to engage the toy, i.e., to actively play with the toy; yet, a very nature of their being "uncontrolled" causes many of these toys to wedge between household furnishings. Once the toys are caught between furniture, their interactive features are lost.

A need is felt for a pet toy that both evokes the chasing instinct of a pet, but one that is also limited in range so that it doesn't lodge between furniture. It is envisioned that a means to limit the present toy's range is a mechanism that contains a reel that winds a stimulated prey away from the pet. A search of the prior art reveals no patents that teach the claims of the present invention; however, the following references are considered pertinent:

U.S. Pat. No. 5,743,215 to Zeff teaches a pet toy attached to a pole and a reel assembly, wherein the toy is manually reeled away from a pet by means of a crank;

U.S. Pat. No. 5,782,207 to Goodham teaches an interactive pet toy that comprises a toy mouse that retracts into a tubular housing by means of a cable, wherein the toy is manually operated by the cat's owner using a handle;

U.S. Pat. No. 5,467,740 to Redwine similarly teaches a toy or a training object reeled in from a lure that is cast, wherein an adjustable drag mechanism provides a means to selectively increase or decrease drag on the anchor line; and, U.S. Pat. No. 5,947,790 to Gordon teaches a line that is receivable on a rotating spool drivingly connected to a motor.

While the present invention incorporates some of the features taught in the foregoing references, others are distinct enough so as to distinguish it over the prior art. More specifically, the most of the references require a pet owner to hold a handle portion so that an attached toy is manually cranked in. The present invention comprises a pet toy that is removably secured to a home fixture such that a wind-up mechanism provides a pet with an opposing force to play with. When a pet owner is not at home, it is anticipated that the pet will pounce a toy that resembles a natural prey in appearance. When the pet grabs the toy to carry it away, the wind-up mechanism delivers an opposing force that reels the prey inward. So, the pet is essentially engaging in a tug-of-war challenge with the wind-up mechanism. Alternatively, the pet owner can pull the toy comprises at the end of the reel to maximum length. The owner then activates a switch that causes the toy to reel towards the mechanism, thus stimulating the pet to chase it.

SUMMARY OF THE INVENTION

It is an object of the present invention to provide a pet toy that interactively engages a pet.

It is an object that a dynamic movement feature of the present toy is that it travels generally linear.

It is an object that a further dynamic movement feature of the present toy is a resistance to the pet playing with it.

It is an object of the present invention to provide a mechanism that limits the range of physical space through which the toy can be utilized.

It is a further object to provide a retracting mechanism by which a variety of toys can be attached.

It is a further objective that the toy attached to the retracting mechanism comprise a pocket in which catnip or another pet olfactory stimulant is contained.

It is an additional object that the mechanism removably secures to a home furnishing, i.e., a table leg, etc.

It is envisioned that the foregoing objects are accomplished by the various embodiments of the present invention, wherein an attractive cat toy, s.a., one that resembles a prey, a bone, etc., is removably tethered to a mechanism that mechanically winds the toy towards it. The mechanism internally contains a reel having the attractive toy attached to its distal end. An opposite side of the mechanism comprises a means to removably secure it to a home fixture, s.a., furniture. Therefore it is anticipated that the present invention provides the advantages of an interactive toy that is limited in travel range so that it cannot get lost between and underneath furniture.

It is a final object of this invention to provide all of the advantages that the foregoing objects entail.

BRIEF DESCRIPTION OF THE DRAWINGS

The advantages and the features of the present invention are better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
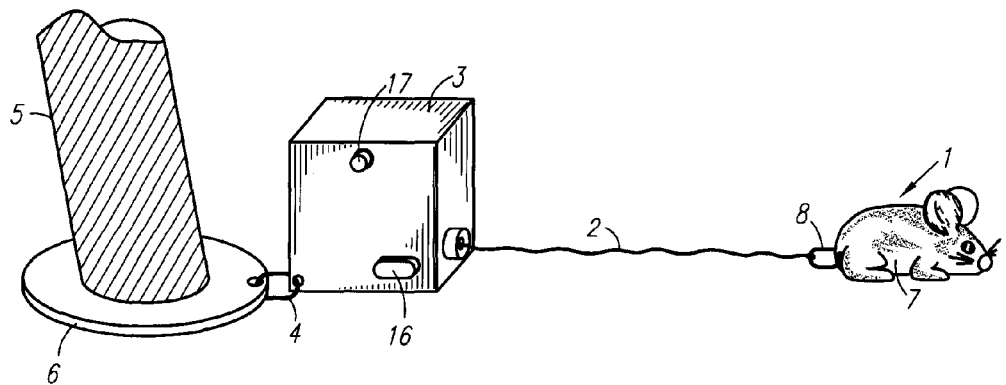
FIG. 1 is a side view of a pet toy according to a preferred embodiment of the present invention, wherein an attractive toy is connected to a retraction mechanism by means of a reel.

FIG. 1 is a pet toy according to a preferred embodiment of the present invention, wherein an attractive toy 1 is connected to a retraction mechanism 3 by means of a reel 2. The attractive toy 1 is shown in FIG. 1 to be a mouse, but it is not limited to any toy that resembles a natural prey. The attractive toy 1 may rather comprises a bone (for dog's), a chew toy, or any other toy that attracts pets. Because mice and birds are common prey hunted by cats, many of these attractive toys 1 may take a form that resembles one of these natural preys, like the mouse in the figure. U.S. Pat. No. 6,371,053, to the present inventor, is such an attractive toy 1, wherein a simulated, cloth mouse comprises a sound chip that emits a prerecorded sound in response to its engagement. It is anticipated that the mouse shown in FIG. 1 emits a sound that more closely replicates the vocalizations of mice. The present invention incorporates all the subject matter of ('053) as if it is fully rewritten herein.

The attractive toy 1 connects to the reel 2 by means of a quick disconnect mechanism 8. The disconnect mechanism 8 may comprise any means well known in the art to engage two parts. It may comprise for example, a pair of threads that mate with corresponding threads on the attractive toy 1, a hook-and-loop fastener combination, a loop and a tie combination, etc. The means is not limited to the foregoing disclosed. It is important that the disconnect mechanism 8 is durable and strong enough to withstand a tug-of-war challenge with a pet. When the pet pulls on the attractive toy 1, the disconnect mechanism 8 competes with the pet so that the attractive toy 1 is not disconnected from the reel 2 and taken away.

The reel 2 is shown in the figure at an extended position, i.e., pulled away from the retraction mechanism 3. The reel 2 is wound inward by means of the retraction mechanism 3 to pull the attractive toy 1 towards it. A detailed teaching of this process will follow.

The retraction mechanism 1 comprises a means to secure it to a stationary object 6 on either an adjacent or a side opposite that of where the reel 2 travels. The means to secure 6 is not limited to the through loop 4 shown connected to the means 6 rung about a stationary object 5 (shown in FIG. 1), but it may rather comprise any other means of attachment known in the art. The stationary object 5 may be either furniture or home fixtures. For example, the stationary object 5 shown in FIG. 1 is a table leg or a chair leg.

Figure 2:
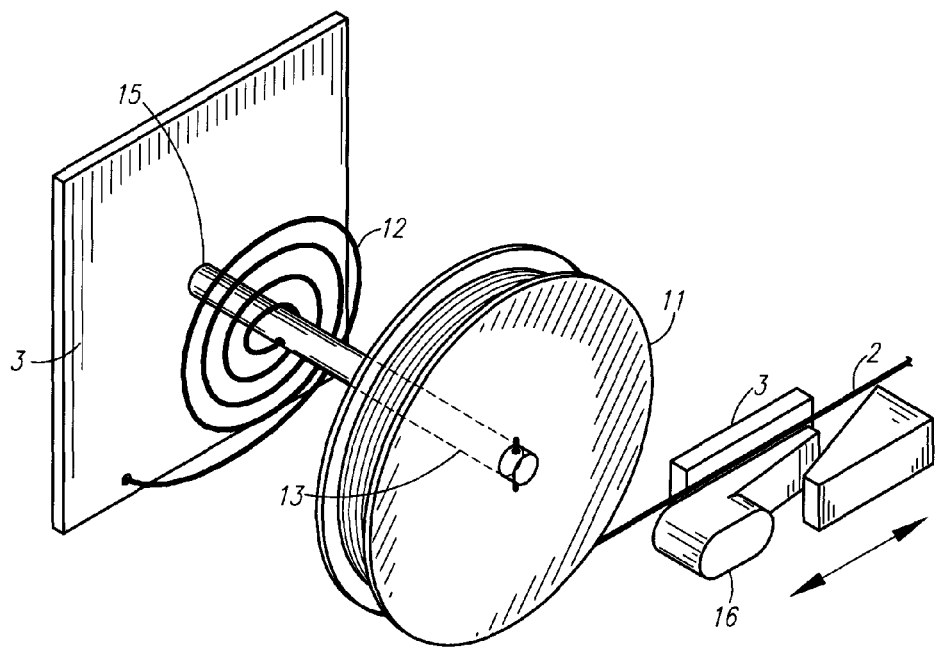
FIG. 2 is view of the internal workings of the retraction mechanism that is part of the pet toy shown in FIG. 1.

Placed on an exterior of retraction mechanism 3 are alternate start and stop switches 16, 17. These switches 16, 17 are used to activate the internal components of the present invention. FIG. 2 is view of the internal workings of the retraction mechanism 3 that is part of the pet toy shown in FIG. 1. The reel 2 winds about a spool 11 that is connected to an axis 13. The axis 13 connects to the internal housing of the retraction mechanism 3 by means of a rounded depression 15 having a slightly smaller circumference than that of the axis 13, wherein an interference fit secures the axis 13 to the housing. Alternatively, the distal end of the axis 13 may comprise male threads (not shown) that mate with corresponding female threads (not shown) within the depression. The opposing distal end of the axis 13 is also supported to an opposing surface of the internal housing of the retraction mechanism 3. A torsion spring 12 is formed about the axis 13, wherein an inter-spiral end of the spring 12 connects to the axis and an opposite end of that spring 12 connects to the internal housing of the retraction mechanism 3. The switches 16, 17 are friction switches that slide between the housing of the retraction mechanism 3 and the reel 2.

Figure 3:
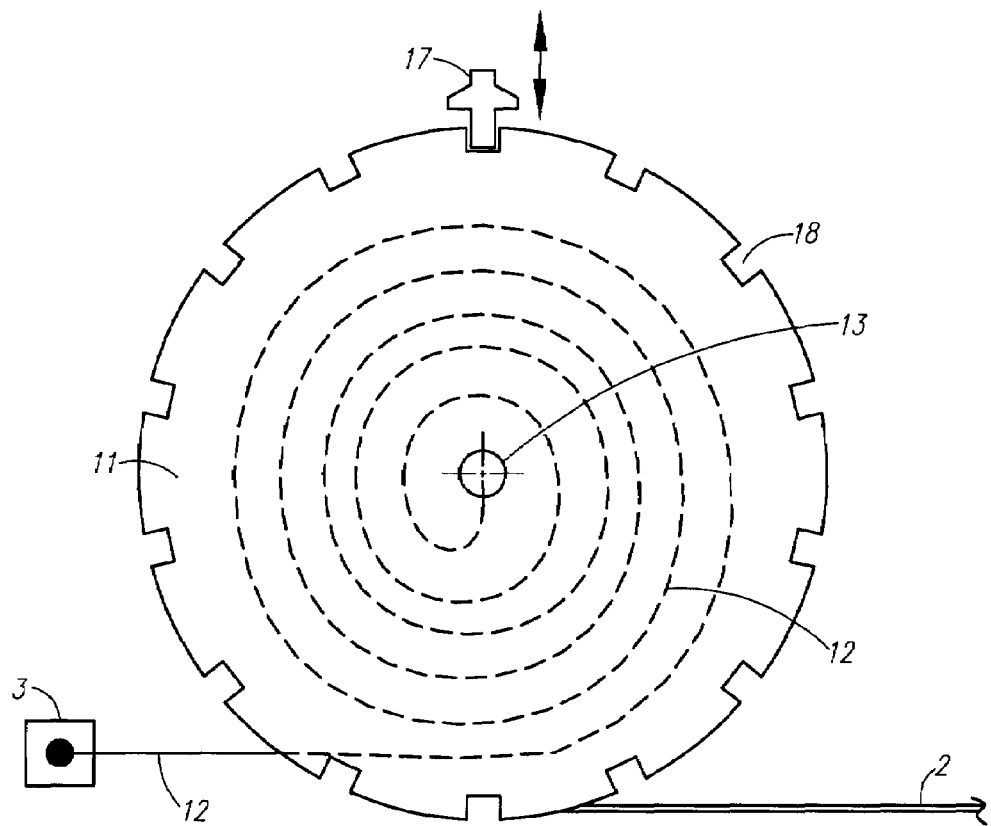
FIG. 3 is side view of the retraction mechanism spool, wherein it comprises locking notches.

FIG. 3 illustrates an alternative embodiment of the internal workings of the retraction mechanism 3, where locking notches 18 work in conjunction with the switches. In this embodiment, the spool 11 comprises notches 18 about its circumference. A level switch 17 fits within a slot formed in the housing of the retraction mechanism 3 slides linearly upwards and downwards, as shown in FIG. 3. The switch 17 is designed to slide into and positively engage a given notch 18 of the spool 11. FIG. 3 further illustrates first that the reel 2 wraps about spool 11 from the axis outwards.

2. Operation of the Preferred Embodiment

To operate a preferred embodiment of the present invention, reference is given to FIG. 1, the attractive toy 1 is shown fully extended from the retraction mechanism 3. As the attractive toy 1 extends away from the retraction mechanism 3, it unwinds about the spool 1. This extension simultaneously causes the torsion spring 12 to wind tightly about the axis 13, thus generating an opposite torque about the axis 13 and the spool 11. Because the torsion spring 12 is attached to both the axis 13 and the internal housing of the retraction mechanism 3, it winds up tightly about the axis 13 as the axis rotates. The resultant torque is applied to the spool 11, whereupon it translates itself into a retraction force upon the reel 2. When the attractive toy 1 is released from a pet's grip, the retraction force pulls the attractive toy 1 towards the retraction mechanism 3.

As is noted in FIG. 1, the retraction mechanism 3 comprises a small loop 4 connected to the housing of retraction mechanism 3. The through loop 4 is shown secured to a ring 6 looped about a bottom of a stationary object 5. The use of the securement ring 6 provides a means for the retraction mechanism to be fixed at a location. As such, when the attractive pet toy 1 is pulled away from the retraction mechanism 3, the retraction mechanism remains affixed to the stationary object 5. When the pet toy 1 is released, it moves back towards the retraction mechanism 3 under the retraction force conveyed by string 2.

The motion of the pet toy 1 can be stopped utilizing the stop/start friction switch 16 that slides between the housing of the retraction mechanism 3 and the reel 2. This is accomplished because the body of the friction switch 16 wedges between the reel 2 and the housing. Friction locks the reel 2 in a fixed location. This is a particularly useful feature because when the retraction force is disabled, a pet can play with the attractive toy 1 simply tethered at an adjustable, extended distance away from the retraction mechanism 1

In an alternative version of the workings of this invention, as noted in FIG. 3, the motion of the pet toy 1 can be stopped by means of a stop/start switch 17 that slides between the housing of the retraction mechanism 3 and into one of the notches 18 comprised on the spool 11. In this embodiment, the sliding of the switch 17 into a notch 18 locks the spool 11 to prevent it from rotating and thus removes the force of retraction on reel 2. This alternate stop/start switch feature is particularly useful as well: the use of the switch 17 provides a means for the length of the reel 2 to be maintained at a fixed length. At a fixed length, the pet can play with the attractive toy 1 within a limited range from the retraction mechanism 3 so that the toy is not lost between and underneath furnishings.

It is finally anticipated that the attractive toy 1 comprise a pocket (not shown) in which catnip or another olfactory stimulant is added. The pocket secures shut by means of various methods well known that include, but are not limited to, a zipper, Velcro, or a button.

The present invention may be constructed of a variety of materials. Although the connection between the retraction mechanism 3 and the pet toy 1 is shown as a reel 2, the actual connection may alternately be by way of a chain, a flexible cord (such as fishing line), or a flexible tape.

The foregoing description is included to illustrate an operation of the preferred embodiment and it is not meant to limit the scope of the invention. As one can envision, an individual skilled in the relevant art, in conjunction with the present teachings, is capable of incorporating many minor modifications that are anticipated within this disclosure. The foregoing descriptions of the specific embodiments of the present invention are presented for the purposes of illustration and description. They are neither intended to be exhaustive nor to limit the invention to the precise forms disclosed and, obviously, many modifications and variations are possible in light of the above teaching. The embodiments are chosen and described in order to best explain the principles of the invention and its practical application, to thereby enable others skilled in the art to best utilize the invention and its various embodiments with various modifications as are suited to the particular use contemplated. It is intended that the scope of the invention be defined by the Specification and Drawings appended hereto and their equivalents. The following Claims are meant only to be exemplary.

What is claimed is:

1. A dynamic pet toy comprising an attractive toy connected to retraction mechanism, said retraction mechanism comprising a reel that winds about a spool connected to an axis; said attractive toy connects to said reel by means of a quick disconnect, said reel winds inward by means of said retraction mechanism to pull said attractive toy towards it;
   wherein said axis connects to a housing of said retraction mechanism by means of a rounded depression having a slightly smaller circumference than that of said axis, wherein an interference fit secures said axis to said housing and wherein said retraction mechanism comprises a means to secure it to a stationary object.

2. The pet toy of claim 1, wherein said attractive toy is simulated, cloth mouse comprising a sound chip that emits a prerecorded sound in response to its engagement.

3. The pet toy of claim 2, wherein said mouse emits a sound that more closely replicates the vocalizations of mice.

4. The pet toy of claim 3, wherein said disconnect mechanism comprises:
   a pair of threads that mate with corresponding threads on said attractive toy;
   a hook-and-loop fastener combination; and,
   a loop and a tie combination.

5. The pet toy of claim 1, wherein said means to secure said retraction mechanism to a stationary object is a through loop wrapped about said stationary object, said stationary object is furniture or a home fixture.

6. The pet toy of claim 1, wherein alternate start and stop switches are placed on an exterior of said retraction mechanism, said switches are used to activate internal components of said retraction mechanism.

7. The pet toy of claim 6, wherein said switches are friction switches that slide between a housing of said retraction mechanism and said reel.

8. The pet toy of claim 1, wherein an opposing distal end of said axis is supported to an opposing surface of said interior housing of said retraction mechanism.

9. The pet toy of claim 1, further comprising a torsion spring formed about said axis, wherein an inter-spiral end of said spring connects to said axis and an opposite end of said spring connects to an interior housing of said retraction mechanism.

10. The pet toy of claim 1, further comprising locking notches that are comprised about a circumference of said spool.

11. The pet toy of claim 10, wherein a level switch fits within a slot formed in said housing of said retraction mechanism, said level switch slides linearly upwards and downwards to positively engage a given notch of said spool.

* * * * *